United States Patent
Bass et al.

(10) Patent No.: US 10,917,473 B2
(45) Date of Patent: Feb. 9, 2021

(54) ROAD SENSOR SYSTEM

(71) Applicant: Astec, Inc., Chattanooga, TN (US)

(72) Inventors: Mike Bass, Chattanooga, TN (US); Chuck Simpson, Soddy Daisy, TN (US); Kris Robertson, Chickamauga, GA (US); Mark Chambers, Rossville, GA (US)

(73) Assignee: Astec, Inc., Chattanooga, TN (US)

( * ) Notice: Subject to any disclaimer, the term of this patent is extended or adjusted under 35 U.S.C. 154(b) by 0 days.

(21) Appl. No.: 16/693,894

(22) Filed: Nov. 25, 2019

(65) Prior Publication Data
US 2020/0195723 A1 Jun. 18, 2020

Related U.S. Application Data

(60) Provisional application No. 62/779,851, filed on Dec. 14, 2018.

(51) Int. Cl.
*G08B 25/14* (2006.01)
*H04L 29/08* (2006.01)
(Continued)

(52) U.S. Cl.
CPC ............. *H04L 67/12* (2013.01); *E01F 9/30* (2016.02); *E01F 9/559* (2016.02); *G08G 1/0116* (2013.01)

(58) Field of Classification Search
CPC ............ H04N 21/4622; H04N 21/222; H04N 21/235; H04N 21/2351; H04N 21/236;
(Continued)

(56) References Cited

U.S. PATENT DOCUMENTS 6,401,027 B1 * 6/2002 Xu .................. G08G 1/0104
340/988
6,592,245 B1 * 7/2003 Tribelsky ............... B64F 1/007
362/259
(Continued)

FOREIGN PATENT DOCUMENTS

WO WO 2016/130804 A1 8/2016

OTHER PUBLICATIONS

Highways Magazine, "Intelligent Road Studs to be Used on Motorway Network for First Time," http://smarthighways.net/intelligent-road-studs-to-be . . . , download date Apr. 21, 2020.
(Continued)

*Primary Examiner* — Daniel Previl
(74) *Attorney, Agent, or Firm* — Chambliss, Bahner & Stophel, P.C.; Stephen D. Adams

(57) ABSTRACT

A road sensor system for sensing data about a road surface and for providing that data, in real time, to data receivers. The system includes a communications network and a data control center that receives and transmits data via the communications network. Sensor assemblies include a housing that is implanted into the road surface, a sensor in the housing that collects sensor data related to an area local to the sensor assembly, and a communications module for communicating sensor data via the communications network from the sensor to the data control center for storage in the database. Sensor data received and stored is associated with location data for a location of the road surface where the housing is implanted. The data receivers receive sensor data or metadata derived from sensor data via the communications network.

17 Claims, 6 Drawing Sheets

(51) Int. Cl.
*E01F 9/30* (2016.01)
*E01F 9/559* (2016.01)
*G08G 1/01* (2006.01)

(58) Field of Classification Search
CPC ......... H04N 21/23892; H04N 21/2407; H04N 21/2541; H04N 21/2543; H04N 21/4117; H04N 21/4131; H04N 21/4135; H04N 21/41415; H04N 21/42684; H04N 21/4307; H04N 21/432; H04N 21/434; H04N 21/4353; H04N 21/43615; H04N 21/4363; H04N 21/4382; H04N 21/4385; H04N 21/4405; H04N 21/44227; H04N 21/45; H04N 21/4532; H04N 21/454; H04N 21/458; H04N 21/472; H04N 21/488; H04N 21/4888; H04N 21/63; H04N 21/633; H04N 21/6543; H04N 21/6582; H04N 21/8352; H04N 21/8355; H04N 5/4401; H04N 5/44543; H04N 5/46; H04N 5/782; H04N 7/08; H04N 7/084; H04N 7/173; H04N 7/24; H04N 21/00; H04N 21/20; H04N 21/21; H04N 21/21815; H04N 21/25; H04N 21/41; H04N 21/4184; H04N 21/4325; H04N 7/14; H04N 21/4143; H04N 21/4432; H04N 21/818; G01R 1/071; G06Q 30/0251; G06Q 10/103; G06Q 50/06; G06Q 20/065; G06Q 20/105; G06Q 20/32; G06Q 20/326; G06Q 20/3274; G06Q 20/3276; G06Q 20/3278; G06Q 20/343; G06Q 20/386; G06Q 20/401; G06Q 20/4014; G06Q 20/40145; G06Q 30/0267; G06Q 30/06; G06Q 30/0601; G06Q 30/0641; G06Q 50/265; G06Q 10/0635; G06Q 20/08; G06Q 20/10; G06Q 20/18; G06Q 30/342; G06Q 30/00; G06Q 30/0215; G06Q 40/08; H04H 20/14; H04H 20/28; H04H 20/30; H04H 2201/70; H04H 40/18; H04H 60/13; H04H 60/21; H04H 60/23; H04H 60/27; H04H 60/31; H04H 60/33; H04H 60/37; H04H 60/40; H04H 60/41; H04H 60/94; H04K 1/00; H04L 63/0861; H04L 29/12; H04L 41/0803; H04L 61/301; H04L 61/305; H04L 63/0823; H04L 63/105; H04L 63/168; H04L 67/025; H04L 67/125; H04L 67/141; H04L 67/34; H04L 61/1511; H04L 61/2514; H04L 12/2807; H04L 12/2825; H04L 12/2836; H04L 12/66; H04L 2012/2841; H04L 61/3065; H04L 67/10; H04L 9/3231; H04L 29/12009; H04L 29/12783; H04L 41/28; H04L 61/2575; H04L 61/2589; H04L 61/35; H04L 61/6063; H04L 63/0853; H04L 67/02; H04L 67/12; H04L 67/26; H04L 67/38; G01V 1/008; G01V 1/22; G01V 1/288; G01V 1/306; G08B 21/10; G08B 27/005; G08B 27/006; G08B 27/008; G08B 27/00; H01L 29/12; G05B 13/026; G05B 19/042; G05B 2219/2639; G05B 23/0272; G05B 13/02; G05B 15/02; H04W 12/06; H04W 12/0602; H04W 12/0608; H04W 12/0609; H04W 4/60; H04W 4/80; H04W 4/90; H04W 76/14; H04W 4/14; H04W 4/40; H04W 4/70; H04W 64/00; H04W 76/50; H04W 8/26; Y04S 40/18; Y04S 20/228; B60W 2420/42; B60W 2420/52; B60W 2554/402; B60W 30/00; B60W 40/04; B60W 2540/30; B60W 40/02; B60W 40/09; B60W 40/10; G01M 3/00; G01S 13/84; G01S 13/867; G01S 2013/9316; G01S 2013/9318; G01S 2013/93185; G01S 2013/9319; G01S 2013/93276; G01S 19/52; G05D 1/0246; G05D 1/0257; G05D 1/0274; G05D 2201/0213; G06K 19/06112; G06K 7/1095; G08C 17/02; G08C 2201/93; H04B 1/385; H04M 1/72547; H04M 1/72583; H05B 47/105; H05B 47/11; H05B 47/125; H05B 47/19; Y02B 20/46; Y02B 71/325; E01F 9/30; E01F 9/559; F16K 17/36; G01C 21/12; G01W 1/00; G06F 11/1482; G06F 11/1625; G06F 11/1645; G06F 11/165; G06F 11/1658; G06F 11/1675; G06F 11/1683; G06F 11/2007; G06F 11/202; G06F 11/2097; G06F 16/95; G06F 2201/845; G06F 9/06; G06F 9/4411; G06F 9/4413; G06F 9/542; G06N 3/08; G07C 2009/00769; G07C 5/008; G07C 5/02; G07C 5/08; G07C 5/0825; G07C 5/085; G07C 5/0858; G07C 9/00309; G07C 9/257; G07C 9/26; G07F 17/329; G08G 1/0112; G08G 1/0116; H02H 5/00
USPC .......... 340/286.02, 907, 936, 933, 447, 438, 340/539.22, 539.26, 825.49
See application file for complete search history.

(56) References Cited

U.S. PATENT DOCUMENTS

| | | | |
|---|---|---|---|
| 2002/0177942 A1* | 11/2002 | Knaian | G08G 1/042 701/117 |
| 2007/0280781 A1* | 12/2007 | Jeong | E01F 9/559 404/16 |
| 2009/0216439 A1* | 8/2009 | Haatainen | G08G 1/20 701/414 |
| 2012/0105252 A1* | 5/2012 | Wang | G08G 1/017 340/936 |
| 2017/0061020 A1* | 3/2017 | Johnson | G06F 16/9535 |
| 2017/0270375 A1* | 9/2017 | Grauer | G06K 9/6293 |

OTHER PUBLICATIONS

Leichman, "Smart Road System Will Make Driving Safer," Mar. 4, 2018, https://www.israel21c.org/smart-road-stud-system-will-make-driving-safer, download date Apr. 21, 2020.
New Scientist, "Smart Studs Keep an Eye on Road Conditions," https://www.newscientist.com/article/mg14619723-600-smart-studs-keep-an-eye . . . , download date Apr. 21, 2020.
Valerann website, https://www.valerann.com, download date Apr. 21, 2020.
Yanko Design, "Smart Road Studs," https://www.yankodesign.com/2015/08/05/smart-road-studs, download date Apr. 21, 2020.
International Search Report and Written Opinion of counterpart PCT Application No. PCT/US2019/62973 dated Feb. 5, 2020.

* cited by examiner

ROAD SENSOR SYSTEM

CROSS-REFERENCE TO RELATED APPLICATIONS

This application claims the benefit of U.S. Provisional Application No. 62/779,851, filed Dec. 14, 2018, and entitled ROAD SENSOR SYSTEM, which is incorporated herein by reference in its entirety.

FIELD

This invention relates generally to road condition monitoring. More particularly, the present invention relates to a system of road-implantable wireless sensors that autonomously and continuously monitor road conditions and that share that data with local and remote data receivers in real time.

BACKGROUND

Historically, road conditions were monitored using weather forecasts and direct observation by drivers located on road surfaces. Weather forecasts provide only general information for entire areas (e.g., regions, states, cities) that may or may not correlate to road surfaces in specific portions of the forecast area. Direct visual observation requires an observer to be located at or near the road surface to make the observations. If there are no observers (e.g., other drivers) present in a particular area, there can be no direct visual observation. Additionally, visual observation of road conditions is only useful to those making the observations once they are already located at or near the road surface. Direct visual observation does not allow for drivers to plan routes based on road conditions. For example, if a portion of a road has been flooded, a driver likely only learns of the flooded road condition once they are amongst traffic of other drivers in the area. Direct visual observation is only useful to other drivers (e.g., drivers considering using a particular route) if those observations are shared amongst drivers. Sharing this information (e.g., via phone call or by road condition monitoring mobile application) could distract the driver. Receiving this shared information also typically requires other drivers to listen to a particular radio station, watch a particular television station, or utilize a particular mobile application.

More recently, indirect visual observation, via cameras, has been employed to improve monitoring road surfaces. Many of these camera systems provide only snapshots of a road surface taken at time intervals. More sophisticated camera systems provide a continuous live feed showing the road surface. Drivers can use these camera feeds to plan their route. However, these camera systems will not automatically update a driver as the road condition changes and will not update the planned route if the road conditions change. Therefore, drivers could plan a particular route that is based on road conditions observed by a camera at one point in time, but deteriorating road conditions (e.g., weather, accident, etc.) could significantly impact that route after it is planned and the driver would be unaware.

Due to their size and expense, cameras are typically only placed at certain key areas (e.g., key intersections or interchanges), and other areas of the road surface that are between these key areas are left unmonitored. Also, cameras are frequently placed at locations far away from and far above (e.g., on towers, etc.) from the road surface. This positioning is necessary to provide a wide enough angle of the road surface to provide useful information of road conditions. The repair and replacement of cameras can be difficult due to their placement high above and far away from the road surface. Installing new cameras at new locations can be difficult due to the need to route power and communications lines to that new location. Lastly, at certain times (e.g., night) or under certain weather conditions (e.g., fog), visual observation of the condition of the road surface may be difficult or impossible. In those situations, the view of the road surface provided by a camera system may be of limited value to drivers considering using the road surface, etc.

Accordingly, what is needed, is a system of rapidly-deployable and easily maintained road sensors and a method of using those sensors for directly and continuously monitoring road conditions for entire road systems and for automatically providing that data, in real time, to drivers and others in the vicinity of and remote from the section of road surface being monitored.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The term "road surface" means any drivable surface, including roads, highways, bridges, and the like. The term "traffic data" means any information related to the status of traffic on the roadway including the speed and density of traffic on the roadway, road closures, detour and evacuation routes, emergency services routes. The term "environmental data" means any environmental data, including atmospheric temperature, moisture, fog presence, wind speed, amount of light, etc. The term "road condition data" means any information related to the condition of the road surface, including whether it is wet, frozen, etc.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by a road sensor system, and a related method of use, including a communications network, a data control center configured to receive and transmit data via the communications network, a plurality of sensor assemblies, and a plurality of data receivers. The sensor assemblies each include a housing configured for implantation into a road surface. One or more sensors are located in the housing and collect sensor data related to an area local to the sensor assembly. This sensor data may include traffic data, weather data, environmental data, or road condition data. A communications module communicates that sensor data, via the communications network, from the sensor to the data control center. The data may then be stored by the data control center in a database, which could include cloud-based storage. To give it relevance in relation to the road surface, sensor data received and stored is associated with location data for a location of the road surface where the housing is implanted. This associates the sensor data with a particular location on the road surface. The data receivers are each configured to receive sensor data or metadata derived from sensor data, preferably in real time, via the communications network. In certain embodiments, the sensors each look and function as road reflectors. The sensors may also be provided with one or more lights, such as RGB LEDs, that are controlled by a controller and that provide visual feedback to drivers located on the road surface. The lights may be configured to emit different colors of light based on different activation signals, which may be based on the sensor data.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
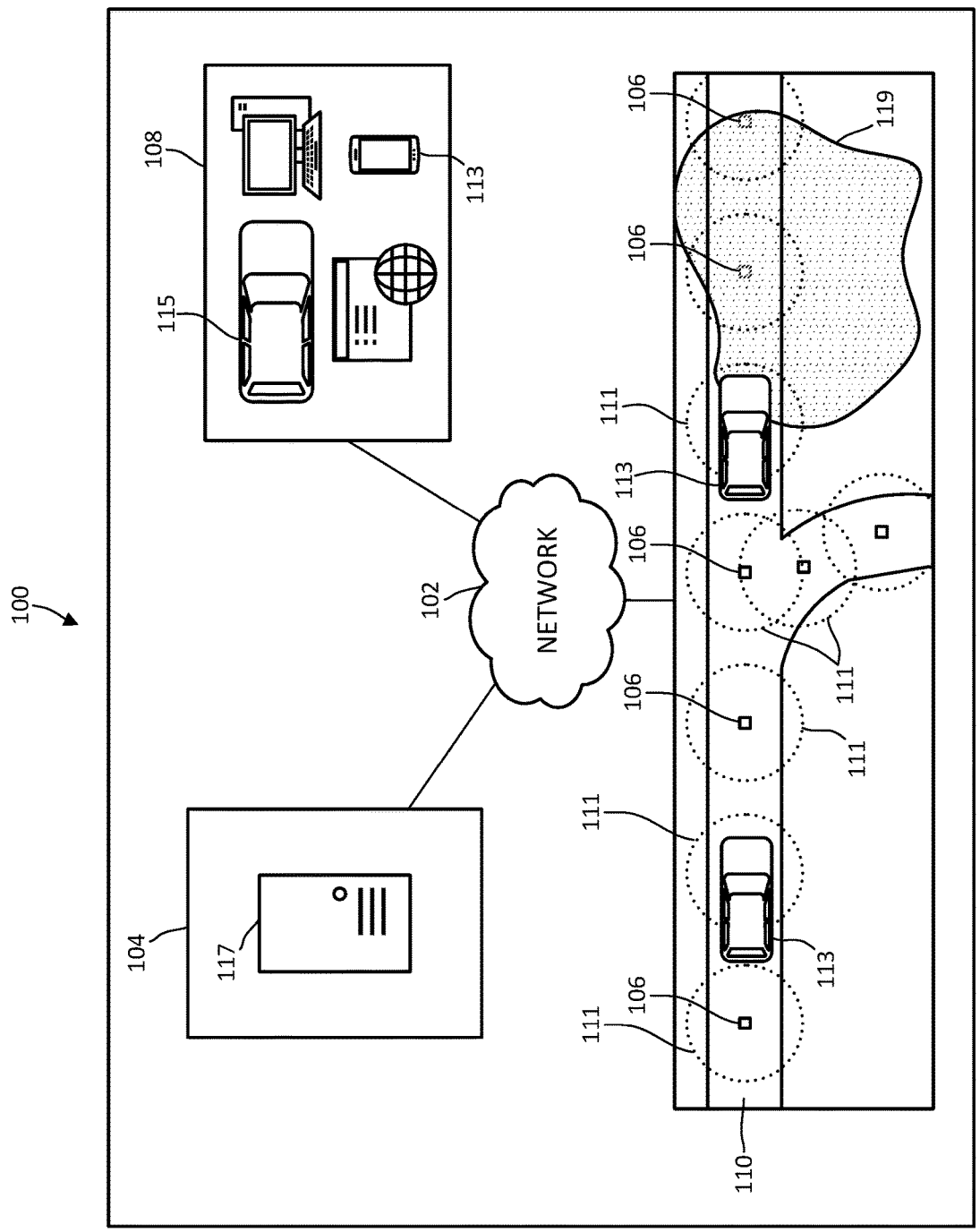
FIG. 1 depicts a road sensor system according to an embodiment of the present invention.

Reference is now made to the drawings in which like reference characters designate like or corresponding characters throughout the several views. With initial reference to FIGS. 1 and 2, a road sensor system 100 according to an embodiment of the present invention is provided. System 100 generally includes a communications network 102, a data control center 104, plurality of sensor assemblies 106, and plurality of data receivers 108.

Sensor assemblies 106 are implanted into a road surface 110 at several locations along the length of the road surface. Each sensor assembly 106 of system 100 preferably is provided with reflector 126 and looks and functions like a conventional road reflector. However, in addition to functioning as road reflectors, sensor assemblies 106 are provided with one or more lights 128 that, as further detailed below, emit one or more colors of light to warn, notify and guide drivers located on road surface 110.

Sensor assemblies 106 are provided with one or more sensors 109 that are configured to collect sensor data related to an area 111 that is local to (i.e., in close proximity) to the sensor assembly. Sensors 109 may detect, for example, one or more of traffic data, weather data, environmental data, road condition data, and other types of data that are of interest and relate to the area local to sensor assembly 106. This could include a range of road hazard conditions 119 that may include rain or snow conditions, traffic incidents, wildlife, pedestrians, etc. Sensors 109 are also configured to detect barometric pressure, light conditions, heat index, fog presence, wind speed, air quality, traffic speed and traffic density, etc. Sensors 109 may include thermocouples, moisture probes, lasers for speed detection and other purposes, etc. The data collected by each sensor assembly 106 is associated with location data for the location of that specific sensor assembly that collected the information. Thus, sensors 109 may also include a position sensor, such as a GPS module that is configured to detect the position of the sensor assembly using a global positioning system.

The sensor data collected by sensor assemblies 106 is transmitted, preferably in real time, over communications network 102 to data control center 104, to data receivers 108, or to both. That transmission of data preferably occurs wirelessly, but communications network 102 could be a wired connection. Communications network 102 may include a Bluetooth or other similar network. However, communication over the Internet via a mobile or cellular network is preferred. While not required, the data collected by sensor assemblies 106 may be transmitted to and stored by data control center 104 in a database 117, such as a cloud-based storage. This may occur either before or at the same time that the data is transmitted to data receivers 108. In other cases, data is first stored to database 117 and is then be transferred, via communications network 102, to data receivers 108 from the database.

Data receivers 108 include local data receivers 113 that are local to or nearby the area 111 where sensors assemblies 106 collecting the data are located. Local data receivers 113 include anything (e.g., wristwatches, cars, devices, etc.) having the ability to receive the sensor data. Sensor data may be communicated directly from sensor assemblies 106 to local data receivers 113 over a suitable wireless communications network 102, such as a Bluetooth or other wireless connection. In addition, sensor data may be communicated over communications network 102 to data receivers 108 that are not located local to or nearby area 111, where sensor assemblies 106 collecting the data are located (i.e., remote data receivers 115). Like local data receivers 113, remote data receivers 115 also include anything having the ability to receive the sensor data. The difference between local data receivers 113 and remote data receivers 115 is that local data receivers are located near the site of data collection, whereas remote data receivers are not. Data transmitted to remote data receivers 115 preferably occurs over a cellular (e.g., 4G, 5G) network. As an example, a local data receiver 113 could include a vehicle with Bluetooth connectivity traveling on a portion of a highway, whereas a remote data receiver 115 could be a smartphone used by a tourist to preview a cross-country travel route that includes that portion of the highway but that is not in the vicinity of the highway. The data may also be provided to transmitted to other interested parties, including those that subscribe to a service providing the sensor data, such as departments of transportation of municipalities, mapping companies, weather reporting companies, news organizations, automobile manufacturers, etc.

Thus, advantageously, and unlike the conventional systems discussed above, system 100 provides actual, accurate and up-to-date information related to road surfaces 110 that is readily available at all times. System 100 provides highly-accurate, real time, and location-specific information about particular sections of road surface 110 preferably along the entire road surface and does not rely on general forecast data. System 100 also does not require a person to be present to report the status of road surface 110. For that reason, information provided by system 100 is continuously up to date. Finally, compared to camera systems discussed above, system 100 is more easily installed, accessed, and maintained because the sensor assemblies 106 are located on the road surface 110 itself and not remote from the road surface.

Figure 2:
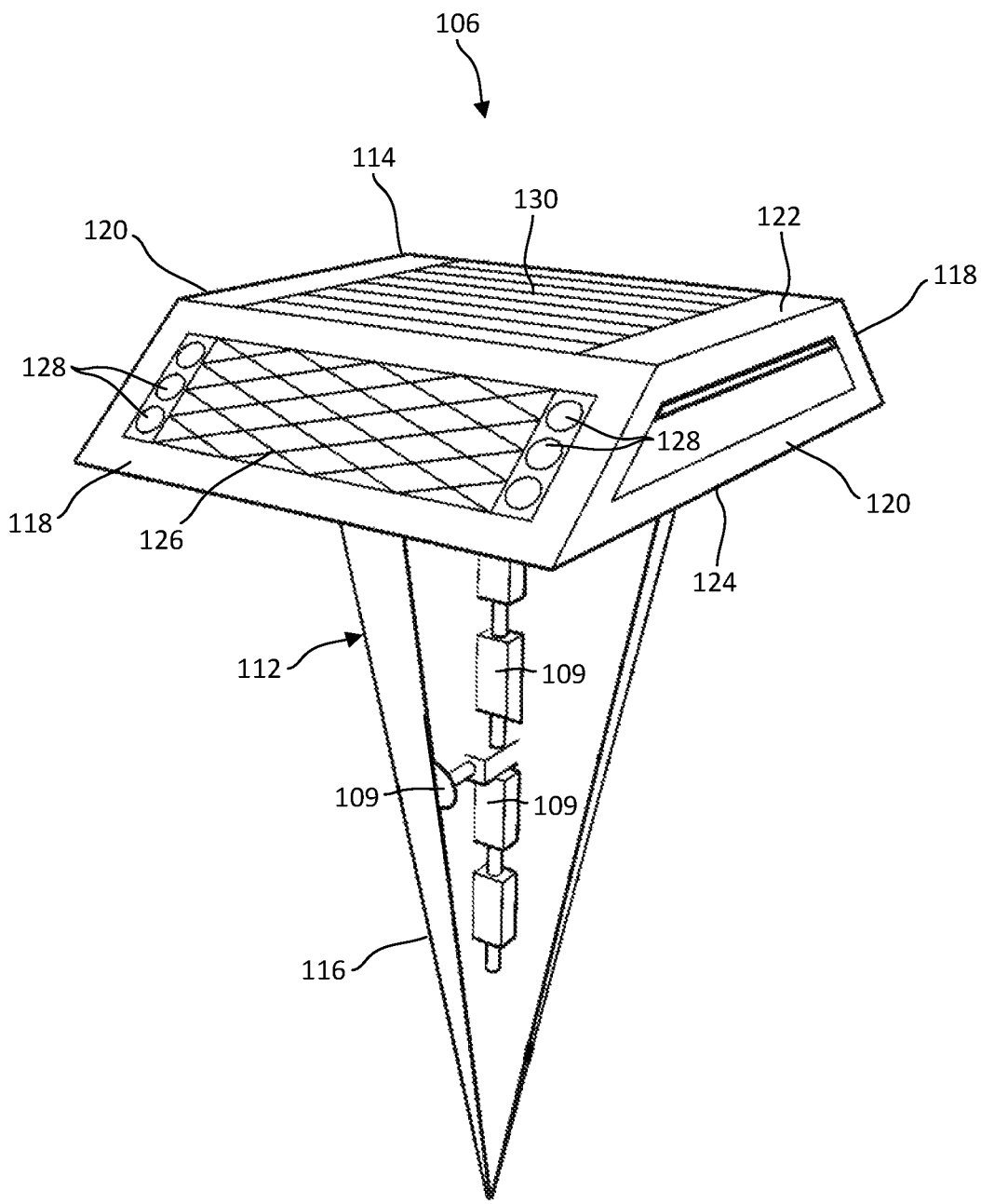
FIG. 2 is a perspective view of a road sensor assembly according to an embodiment of the present invention, including a partial cutaway section depicting a sensor located inside the road sensor assembly.
Figure 5:
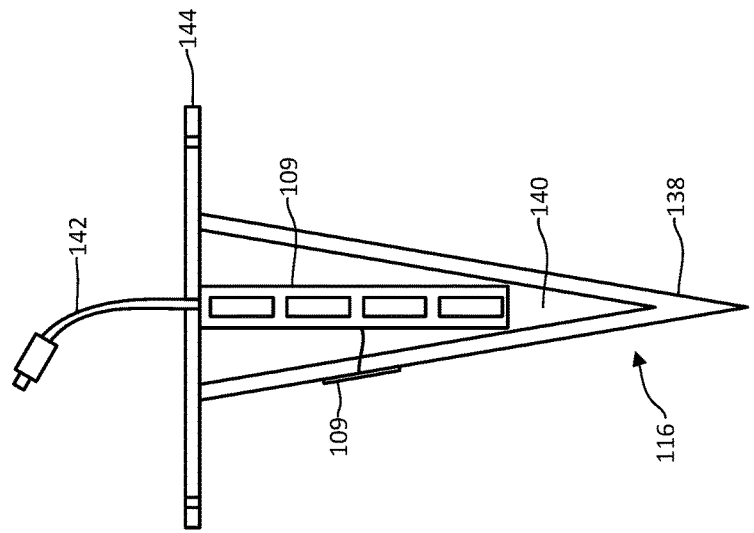
FIG. 5 is a sectional view depicting a cavity portion of the road sensor assembly of FIG. 2.
Figure 3:
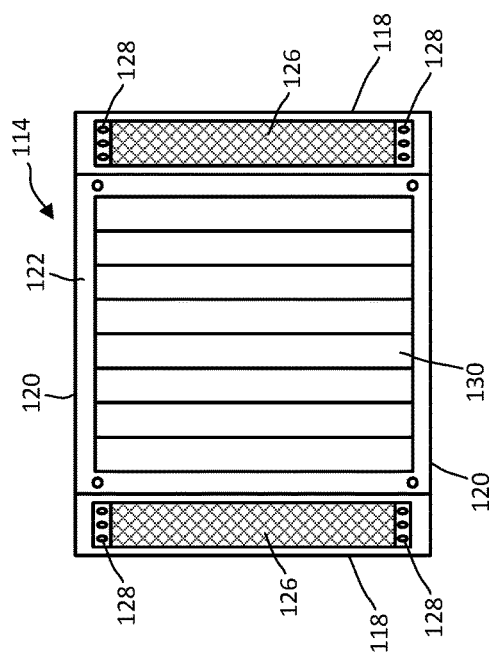
FIG. 3 is a top plan view of a cover portion of the road sensor assembly of FIG. 2.
Figure 4:
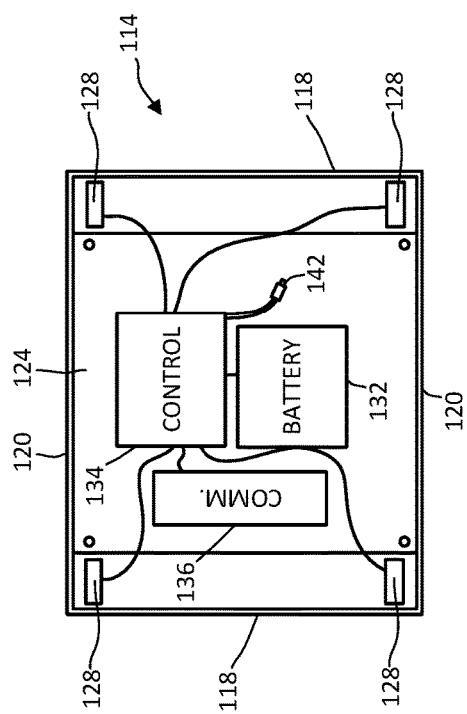
FIG. 4 is a bottom plan view of the cover portion of the road sensor assembly of FIG. 2.

With continued reference to FIG. 2 and with further reference to FIGS. 3-5, each of sensor assemblies 106 includes a housing 112 that is implanted into road surface 110 when the sensor is placed into use. Housing 112 preferably includes a cover portion 114 and a cavity portion 116 connected to and positioned underneath cover portion. Cover portion 114 includes opposing ends 118, opposing sides 120, a top 122, and an open bottom 124. In this illustrated embodiment, when housing 112 is implanted, top 122 is generally parallel with a top of road surface 110 and ends 118 angle downwards away from the top towards the road surface.

Preferably, road reflectors 126 and one or more lights 128 are provided on each of the ends 118 of cover portion 114, which are pointed either towards or away from the direction of traffic when installed so that the reflectors and lights are visible to drivers on the road surface 110. As further detailed below, lights 128 are preferably configured to provide two or more different colors of light. For that reason, in certain embodiments, lights 128 include a plurality of tri-color (RGB) light emitting diodes (LEDs). Lights 128 may be powered by a variety of power sources, including hardwired power supply (e.g., municipal power), battery, etc. In this case, lights 128 are powered by a solar panel 130, which is located on top 122 of cover portion 114. The inside of cover portion 114 is preferably shelled to provide storage for and easy access to (via open bottom 124) lights 128 as well as other internal components for maintenance, replacement, etc. These other components may include power storage, such as rechargeable battery 132 that is in electrical communication with and is configured to store power generated by solar panel 130 for later use by lights 128, sensors 109, and other electrical components of the sensor assembly 106. Other components that may be stored in the shelled interior of the cover portion 114 include a control board 134 for controlling the functionality of sensor assembly 106, including activating and deactivating lights 128, and a communications module 136 (e.g., an NB-IoT transceiver) for receiving and transmitting data to and from sensor assembly 106.

Figure 6C:
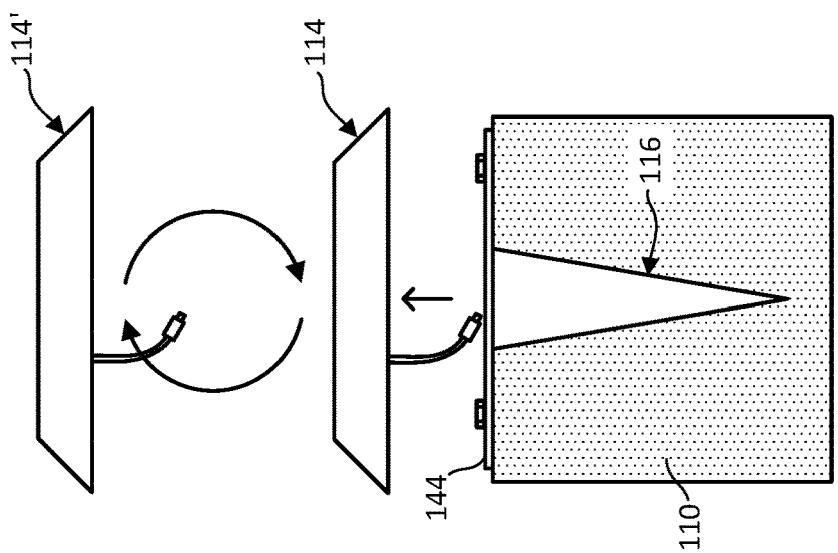
FIGS. 6A-6C depict a road sensor assembly being installed into a road surface and an interchangeable cover portion being replaced with another interchangeable cover portion according to an embodiment of the present invention.
Figure 6B:
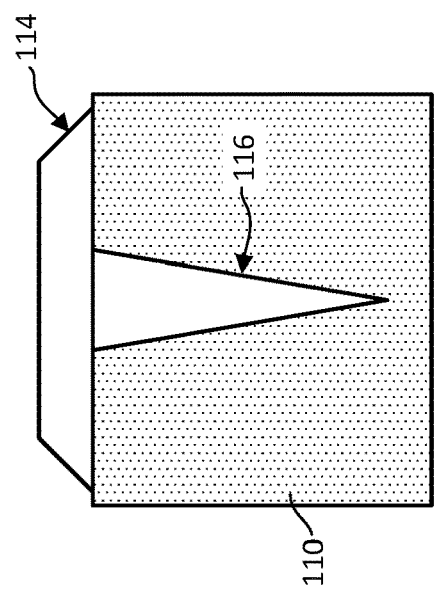
Figure 6A:
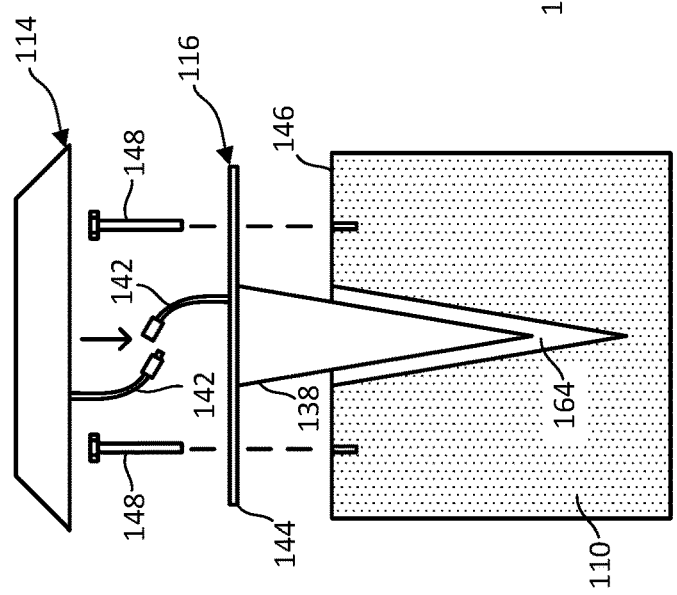

With continued reference to FIG. 5 and with further reference to FIGS. 6A-6C, cavity portion 116 is provided with a shelled lower portion 138 that includes an internal storage area 140, where sensors 109 and other components of sensor assembly 106 may be located. Corresponding electrical interfaces 142 connect the components in cover portion 114 to those components in cavity portion 116. In this particular case, all sensors 109 are located in cavity portion 116 and battery 132, control board 134 and communications module 136 are located in cover portion 114. However, in different embodiments, different, other or no components may be located in either of cover portion 114 and cavity portion 116 of housing 112.

Cover portion 114 is preferably removably connected to cavity portion 116. This removable connection is preferably waterproof. When sensor assembly 106 is implanted into road surface 110, at least a portion of cover portion 114 is exposed to enable housing 112 to be easily accessed and to allow reflector 126 and lights 128 to be visible from the road surface. In this particular embodiment of the invention, a mounting cap 144 is preferably placed over and affixed to lower portion 138 of cavity portion 116. Cavity portion 116 is installed into road surface 110 by first forming a suitable-sized opening 164 in the road surface. Opening 164 may be formed in road surface 110 when the road surface is in the process of being constructed or may be formed after the road surface has been completed and has hardened. Lower portion 138 is inserted into opening 164 and mounting cap 144 rests on a top surface 146 of road surface 110. Fasteners 148, such as bolts, may be used to fixedly mount cavity portion 116 to road surface 110. Advantageously, removably connecting cover portion 114 to cavity portion 116, enables replacement cover portion 114' portion to be easily substituted in place of cover portion 114, such as during maintenance activities or to provide a cover portion having different functionality (e.g., different sensors).

Figure 7:
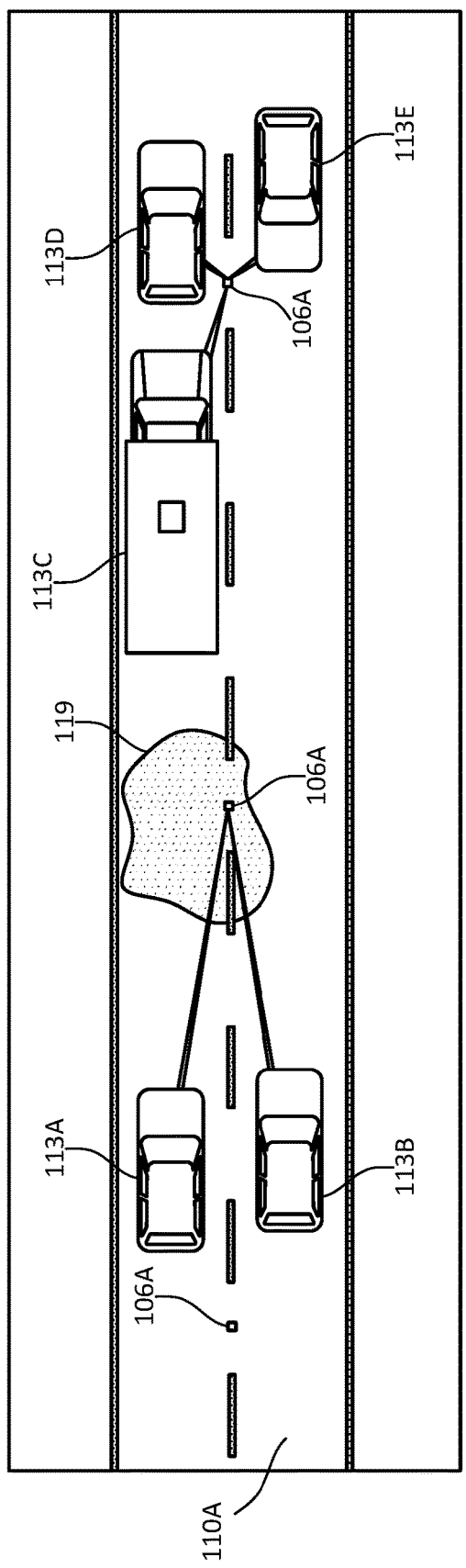
FIG. 7 depicts a plurality of sensor assemblies installed in a road surface detecting traffic data according to an embodiment of the present invention.
Figure 7:
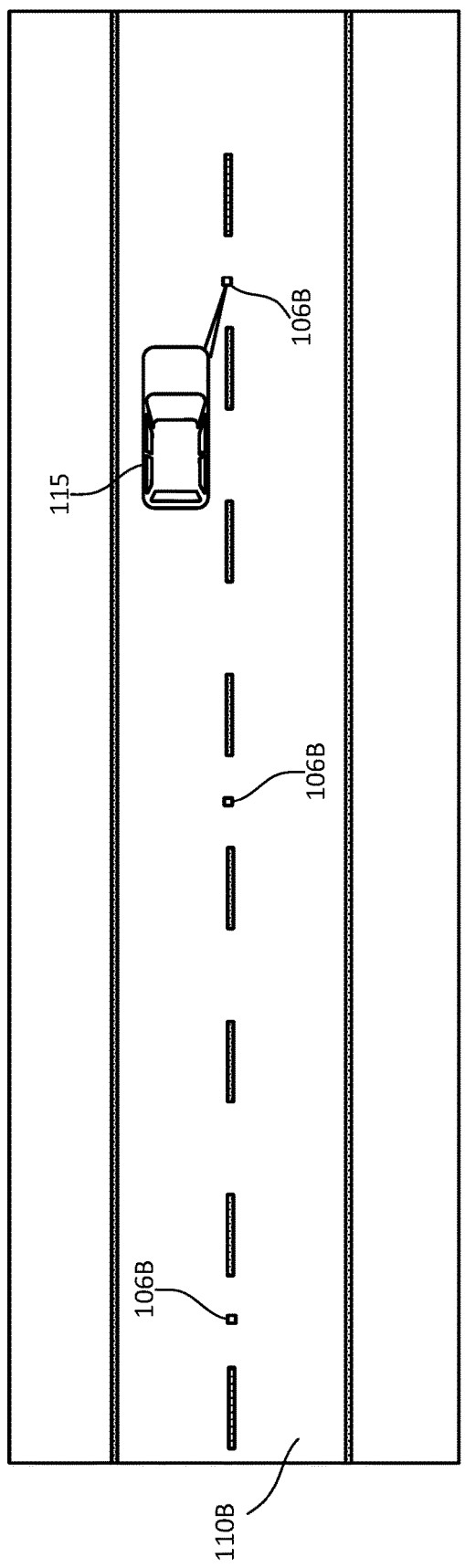

In operation, road sensor system 100 preferably collects data and transmits data to data receivers 108 automatically without requiring input from an operator. The information provided by system 100 could assist users in avoiding road collisions and heavy traffic, to plan optimal driving routes, etc. With reference to FIG. 7, there is provided a first road section 110A and a second road section 110B that are remotely located from one another. Road sections 110A, 110B are each equipped with sensor assemblies 106A, 106B, respectively. With respect to first road section 110A, vehicles 113A-113E are local data receivers that may be provided with information obtained by sensor assemblies 106A that concerns that first road section and the surrounding area. Because of the proximity between vehicles 113A-113E and sensor assemblies 106A, information may be transmitted directly via a short distance wireless network (e.g., Bluetooth). Information may also be transmitted via a long-range cellular or other wireless network. With respect to first road section 110A, vehicle 115 is a remote data receiver. Vehicle 115 may be provided with information about road section 110A that was obtained by sensor assemblies 106A via a cellular network and with information about road section 110B that was obtained by sensor assemblies 106B via a cellular or Bluetooth network.

In general, sensor assemblies are configured to detect road hazard conditions, such as frozen or wet areas of the road surface, using the onboard sensors. Atmospheric conditions, such as rain or fog conditions may also be detected. Additionally, traffic conditions, such as traffic collisions, may be detected by noise sensors that have been configured to detect the sounds of vehicle collisions. Sensor assemblies may also be equipped with speed detectors that can determine the instantaneous or average speed of vehicles traveling along the road surface and can also determine when the instantaneous or average speed is above or below a predetermined value (e.g., when average traffic speed is below 20 mph, which could indicate a road hazard). Furthermore, sensor assemblies may be configured to detect sudden braking or a sudden decrease in the instantaneous or average speed of vehicles, which could also indicate a road hazard.

In preferred embodiments, sensor assemblies are configured to automatically provide activation signals to activate the onboard lights in response to certain trigger conditions, including when certain of the above-described hazards are detected. For example, referring again to FIG. 7, if sensor assemblies 106A detect that the speed of vehicles 113C and 113D have dropped below a given threshold value (e.g., 20 mph), a warning may be provided to vehicle 113A that there could be a road hazard, which would give the driver of that vehicle more time to slow their own vehicle. In certain embodiments, the vehicle 113A itself may respond automatically to the warnings provided (i.e., automatic braking in response to warning signals).

The warnings provided could be in the form of an audible warning broadcast inside of the vehicle or a visual warning provided in a heads-up or other in-vehicle display. In other embodiments, the lights provided on the sensor assemblies 106A may be activated in response to a trigger condition. The color and nature of the illumination may change depending on the nature of the event. For example, if sensor assemblies 106A detect that the speed of vehicle 113C has dropped below a first threshold value (e.g., 40 mph), the lights may slowly flash amber to indicate possible danger. If sensor assemblies 106A detect that the speed of vehicle 113C has dropped below a second threshold value (e.g., 20 mph), the lights may quickly flash red to indicate more immediate danger. Similar warnings could be provided for a change in speed (i.e., rate of acceleration/deceleration) as well as any of the other types of detected events discussed herein. For example, if a vehicle, such as vehicle 113E, is traveling the wrong direction (e.g., on a one-way street), warnings could be provided to vehicle 113E as well as to all other surrounding vehicles of the dangerous condition.

In other embodiments, lights may be used as a guide. For example, in the event of an emergency services response (police, fire, etc.), blue lights could be provided to guide those emergency responders to their destination. For example, blue lights could direct fire trucks to the site of a burning building or an ambulance to a hospital. In another example, orange lights could also guide traffic through a detour or out of a danger area during an evacuation. An advantage of this system is that the warnings described above would not only be available to local data receivers 113A-113E, but would also be made available, substantially in real time, to remote data receivers 115 as well. This would enable those remote data receivers 115 to plan for and to respond appropriately to the information in advance (e.g., change routes, slow down, etc.). For example, escape routes could be shown on a map in a mobile application in use by vehicles, which could assist evacuees in finding the quickest path to travel to the escape route.

Figure 8:
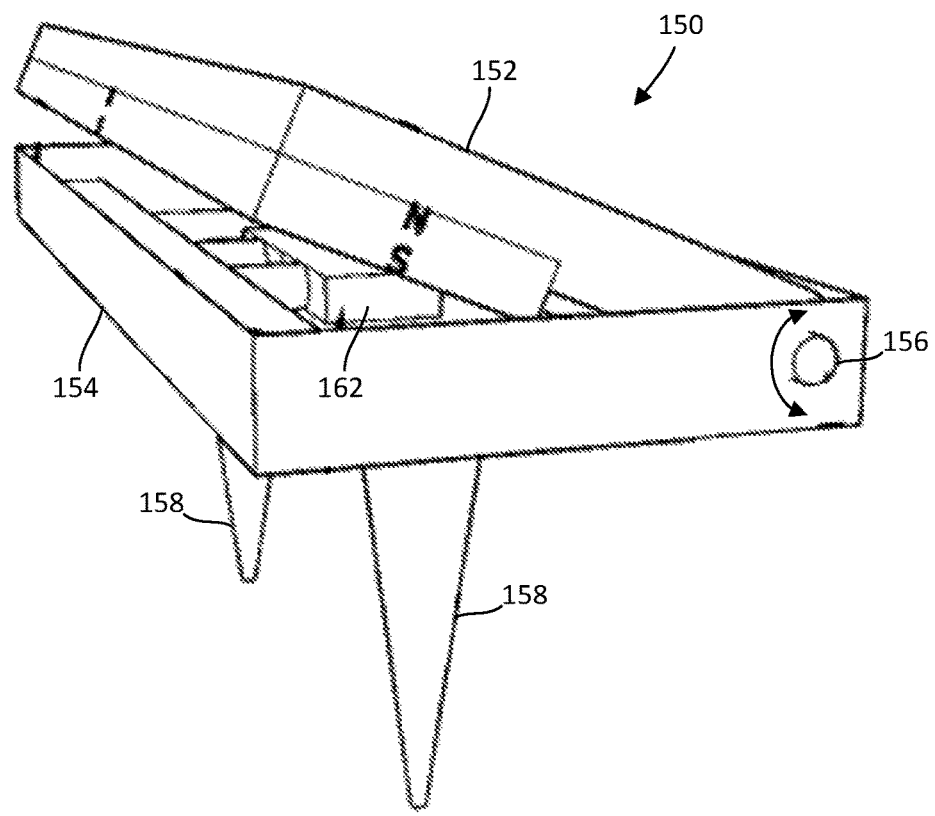
FIG. 8 is a perspective view depicting a drive plate power supply according to an embodiment of the present invention.
Figure 9:
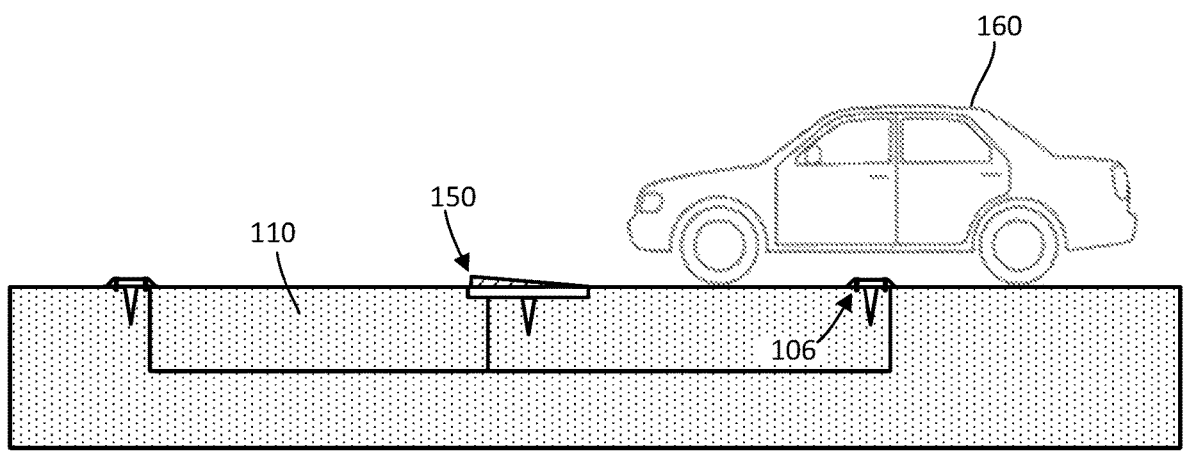
FIG. 9 depicts a road surface provided with a pair of road sensor assemblies electrically connected to and powered by a drive plate power supply according to an embodiment of the present invention.

Referring now to FIGS. 8 and 9, there is provided an electro-kinetic drive plate 150 that may be electrically connected to and used to provide power to sensor assemblies 106 in addition to or as an alternative power source to solar panel 130. Drive plate 150 includes a drive surface 152, which is rotatably mounted to frame 154 at pivot 156 and preferably extends substantially across one or more driving lanes of the road surface 110 in which it is installed. Frame 154 is fixedly mounted in road surface 110 by anchors 158. As vehicle 160 drives over plate 150, the weight of the vehicle causes the drive surface 152 to rotate downwards (i.e., counterclockwise, as shown in FIG. 8) about pivot 156. Drive surface 152 is preferably biased to the upwards position such that the drive surface rotates clockwise (as shown in FIG. 8) about pivot 156 once the weight of the vehicle 160 has been removed. A power generator 162 is placed into the frame 154 to generate power from the upward and downward movement of the drive surface 152. Power generator 162 could include one or more of the following: piezo-electro pressure plate, opposing-pole magnets, and other similar kinetic power generators. A charge pump may be provided to hold charge generated by generator 162.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:
1. A road sensor system comprising:
a communications network;
a data control center configured to receive and transmit data via the communications network;
a plurality of sensor assemblies, each sensor assembly having:
 a housing configured for implantation into a road surface;
 a sensor disposed in the housing that is configured to collect sensor data related to an area local to the sensor assembly;
 a first light that, when activated, is visible to drivers of vehicles located on the road surface; and
 a controller for activating and deactivating the first light;
 a communications module for communicating sensor data via the communications network from the sensor to the data control center for storage in a database, wherein sensor data received and stored is associated with location data for a location of the road surface where the housing is implanted; and
a plurality of data receivers configured to receive at least one of sensor data or metadata derived from sensor data via the communications network.

2. The road sensor system of claim 1 wherein the controller is configured to provide first and second activation signals to activate the first light, and the first light is configured to emit a first colored light in response to the controller providing the first activation signal and to emit a second, differently-colored light in response to the controller providing the second activation signal.

3. The road sensor system of claim 1, wherein the first light, when activated, is visible to drivers of vehicles located on the road surface approaching the sensor assembly from a first direction but is not visible from a second direction, the road sensor system further comprising a second light disposed in the housing that, when activated, is visible to drivers of vehicles located on the road surface approaching the sensor assembly from the second direction but is not visible from the first direction.

4. The road sensor system of claim 1 wherein the housing is formed by a cavity portion configured to be implanted into a road surface and a cover portion that is configured to be removably mounted to the cavity portion when the cavity portion is implanted into the road surface such that at least a portion of cover portion is exposed when the housing is implanted in the road surface, wherein a first reflector is disposed on said exposed portion.

5. The road sensor system of claim 1 further comprising a first reflector disposed on the housing and visible to drivers of vehicles located on the road surface.

6. The road sensor system of claim 1 wherein the housing of each sensor assembly has at least a portion that is exposed and accessible from above the road surface when the housing is implanted in the road surface.

7. A method for providing data about a road surface comprising the steps of:
   A. providing a road sensor system having:
      a communications network;
      a data control center having a database;
      a plurality of sensor assemblies, each sensor assembly having: a housing; a sensor disposed in the housing; and a communications module; and
      a plurality of data receivers;
   B. implanting the housing of the plurality of sensor assemblies into a road surface of the road surface;
   C. with one or more sensors of the road sensor system, collecting sensor data related to an area local to the sensor;
   D. communicating collected sensor data via the communications network to the data control center using the communications module of the sensors of the one or more sensor assemblies;
   E. storing sensor data received by data control center to the database;
   F. associating the stored sensor data with location data for a location of the road surface where the housing is implanted; and
   G. with at least one of the plurality of data receivers, receiving at least one of sensor data or metadata derived from sensor data via the communications network.

8. The method of claim 7 wherein sensor data received by the at least one data receiver at Step (G) is received substantially in real time.

9. The method of claim 7 further comprising the steps of:
   providing, as part of each of said plurality of sensor assemblies, a first light that is located on the housing and is visible to drivers of vehicles located on the road surface and a controller for activating and deactivating the first light;
   providing a first activation signal using the controller for activating the first light.

10. The method of claim 9 further comprising the steps of:
   providing a first activation signal to the first light with the controller such that, in response to receiving the first activation signal, the first light emits a first colored light; and
   providing a second activation signal to the first light with the controller such that, in response to receiving the second activation signal, the first light emits a second, differently-colored light.

11. The method of claim 9 wherein the first activation signal is provided in response to a trigger condition related to the sensor data collected by one or more sensors of the road sensor system.

12. The method of claim 11 further comprising the step of determining at least one of an instantaneous speed or an average speed of vehicles on the road surface using the road sensor system, wherein the first activation signal is provided automatically in response to the trigger condition, and wherein the trigger condition is a change of the instantaneous speed or average speed of one or more of the vehicles that exceeds a predetermined rate of change.

13. The method of claim 11 further comprising the step of determining at least one of an instantaneous speed or an average speed of vehicles on the road surface using the road sensor system, wherein the trigger condition occurs when the instantaneous speed or average speed of one or more of the vehicles is below a predetermined speed.

14. The method of claim 7 further comprising the steps of:
   providing, as part of each of said plurality of sensor assemblies, a first light and a second light that are each located on the housing and a controller for activating and deactivating the first and second lights;
   activating the first light using the controller such that it is visible to drivers of vehicles located on the road surface approaching the sensor assembly from a first direction but not visible to drivers of vehicles located on the road surface approaching the sensor assembly from a second direction; and
   activating the second light using the controller such that it is visible to drivers of vehicles located on the road surface approaching the sensor assembly from the second direction but not visible to drivers of vehicles located on the road surface approaching the sensor assembly from the first direction.

15. The method of claim 7 wherein the sensor data comprises at least one of the following types of data for the area local to the sensor assembly: traffic data, weather data, environmental data, or road condition data.

16. The method of claim 7 wherein the at least one data receiver in Step (G) is located at a first location and wherein the sensor data received at Step (G) by the at least one data receiver is collected by one or more sensors of the road sensor system located at a second location that is remotely located from the first location.

17. A road sensor system comprising:
   a communications network;
   a data control center configured to receive and transmit data via the communications network;
   a plurality of sensor assemblies, each sensor assembly having: a housing configured for implantation into a road surface; a sensor disposed in the housing that is configured to collect sensor data related to an area local to the sensor assembly; a first light disposed on the sensor assembly such that, when activated, the first light is visible to drivers of vehicles located on the road surface; a controller disposed in the housing for activating and deactivating the first light and configured to provide two or more activation signals to activate the first light, where the first light emits a first light signal in response to a first one of the two or more activation signals and to emit a second and different light signal in response to a second one of the two or more activation signals; and a communications module disposed in the housing for communicating sensor data from the sensor assembly to the data control center via the communications network for storage in a database, wherein sensor data received and stored is associated with location data for a location of the road surface where the housing is implanted; and a plurality of data receivers configured to receive at least one of sensor data or metadata derived from sensor data via the communications network.

* * * * *